(Model.)
R. K. NICHOLS.
CULTIVATOR.
No. 289,127. Patented Nov. 27, 1883.
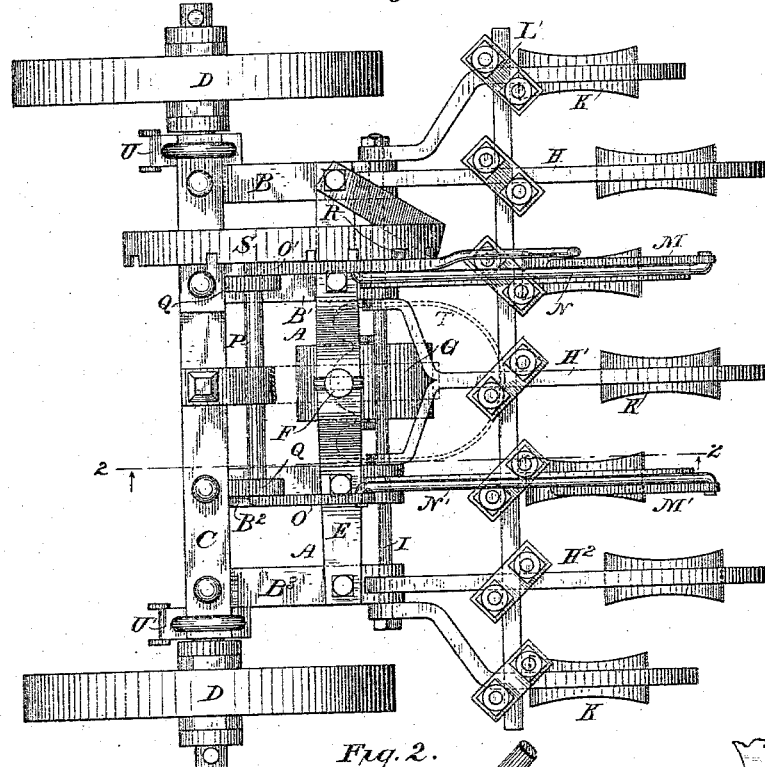
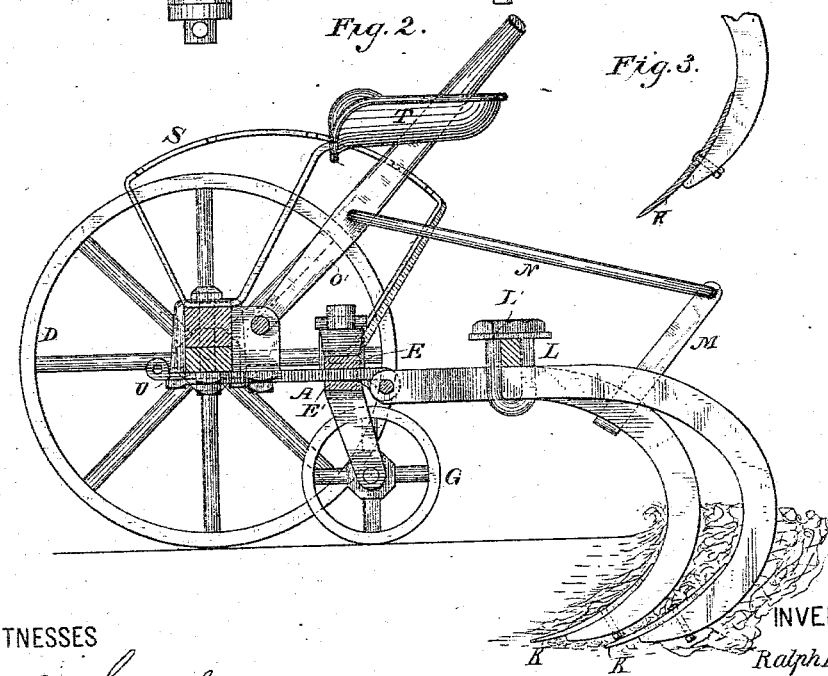
WITNESSES
Wm. A. Skinkle
H. W. Elmore
INVENTOR
Ralph K. Nichols
By his Attorney,

United States Patent Office.

RALPH K. NICHOLS, OF LOWER LAKE, CALIFORNIA.

CULTIVATOR.

SPECIFICATION forming part of Letters Patent No. 289,127, dated November 27, 1883.

Application filed July 30, 1883. (Model.)

*To all whom it may concern:*

Be it known that I, RALPH K. NICHOLS, a citizen of the United States of America, residing at Lower Lake, in the county of Lake and State of California, have invented certain new and useful Improvements in Wheel-Cultivators, of which the following is a specification, reference being had therein to the accompanying drawings.

My invention relates to an improved apparatus for elevating and depressing the teeth of the cultivator, operated from the driver's seat, and to the use of a swivel trail-wheel in the rear, which keeps the machine level, prevents its burying behind, helps in holding it upon a side-hill, and greatly facilitates the operation of the machine; and it consists in the details of construction particularly described below.

In the accompanying drawings, which illustrate the construction and operation of my invention, Figure 1 is a plan view of my cultivator. Fig. 2 is a view in cross-section across the line 2 2 of Fig. 1, and Fig. 3 shows my method of attaching the tooth of the cultivator to the shank.

A is the iron bed of the cultivator, which consists of the beams B B' B² B³, forked at one extremity to receive the shanks of the teeth, and at the other extremity bolted rigidly to the axle C of the wheels D D. Two cross-bars, E E', are securely bolted to the notched ends of the beams B B', &c., the one above, the other below, the beams. The upper cross-bar, E, is bowed in the center between beams B' and B², and both upper and lower beams, E and E', are provided with an aperture to receive the standard F of the swivel-wheel G, which is secured in any desirable manner. The swivel-wheel G is left free to turn in any direction. The curved shanks or drag-bars H H' H², &c., of the teeth are set in and out to prevent clogging, and are pivoted independently of each other in the notches of and between the beams B B', &c., by the round rod I, which thus fastens them to the bed of the machine. The teeth K, which may be either chisel or bull tongued, as desired, are secured to the shanks by two bolts, and are reversible, so that when one edge has been worn out the tooth may be revolved, again secured in place, and a new edge thus obtained for use. The shanks H H', &c., are connected together and held in their relative positions with respect to each other by the cross-brace L, to which they are attached by a staple, plate, and bolt, L'. They may also be fastened in any other suitable manner.

The device for lifting and lowering the teeth is as follows: Two standards, M M', are firmly secured, each to a shank of the cultivator, at a suitable distance from each other. Links N N' connect the upper extremity of the standards M M' to the arms O O' of the rod P, which project at a right angle to the rod. Rod P is pivoted through lugs Q Q' on the beams B' B² of the bed, and one of the arms, O', is prolonged into a lever-handle, by which rod P can be caused to revolve and lift or depress the teeth of the cultivator by means of its rigid connections through arms O O', links N N', and standards M M'. A nib, R, on lever O' fits into square notches in the ratchet S, so as to hold the lever firmly in whatever position it may be placed. The notches in the ratchet are made square and at a given distance from each other in order to hold the cultivator-teeth in the ground, to regulate the depth at which the ground is to be cultivated, and to hold the teeth out when not in use. The ratchet S is firmly bolted to the bed A and to the axle C of the machine at one side of the driver's seat T.

U U' are the clips in front of axle C, to which the ordinary wagon-tongue of the cultivator is attached.

The advantages presented by the foregoing construction consist in the great steadiness of the cultivator on a side-hill, and the increased facility with which it may be turned, both owing to the presence of the swivel-wheel, whereby it is rendered particularly available for the cultivation of vineyards, the proximity of the teeth to the horses, which avoids any waste of power in drawing, and the simplicity of the lifting device.

The drawings show a cultivator to be used with four horses. Six horses should be used with a cultivator of ten teeth and two horses with one of four.

What I claim as new, and desire to secure by Letters Patent, is—

1. In a two-wheeled cultivator, the combination, with the two front wheels, of a central swivel trail-wheel pivoted to the cultivator-bed in front of the cultivator drag-bars and directly in the rear of the axle, and free to assume any position, substantially as hereinbefore set forth.

2. In a two-wheeled cultivator, the combination of the axle, the swivel-wheel close in its rear, the frame-bars forked at their rear ends, the cross-braces E E', the former arched to form a wide bearing for the swivel-wheel, the curved drag-bars made rigid to each other by the cross-bar L, and the shaft I, substantially as hereinbefore set forth.

3. In a two-wheeled cultivator, the combination, with the axle, of the cultivator-bed, as shown and described, the shaft I, passing through the forked beams and the shovel-bars, the rigid arms M, connecting-rods N, the lever, and rock-shaft having arm O', and the bar L, substantially as hereinbefore set forth.

In testimony whereof I affix my signature, in presence of two witnesses, this 5th day of July, 1883.

RALPH K. NICHOLS.

Witnesses:
GEO. B. FOX,
MORRIS LEVY.